INVENTOR.
HAROLD BORKAN
BY
W. H. Sprague
ATTORNEY

INVENTOR.
HAROLD BORKAN
BY
W. H. Sprouagle
ATTORNEY

United States Patent Office 3,435,138
Patented Mar. 25, 1969

1 2

3,435,138

SOLID STATE IMAGE PICKUP DEVICE UTILIZING INSULATED GATE FIELD EFFECT TRANSISTORS

Harold Borkan, Princeton, N.J., assignor to Radio Corporation of America, a corporation of Delaware Filed Dec. 30, 1965, Ser. No. 517,623
Int. Cl. H04n 3/14; H03k 23/22; H01j 39/22
U.S. Cl. 178—7.1 6 Claims

ABSTRACT OF THE DISCLOSURE

An image sensing panel with a thin film transistor at each pickup element is provided, the source electrodes of each row of the transistors are all energized at one time by pulses from a vertical scanning generator and the insulated-gate electrodes of each column of the transistors are all energized at one time by pulses from a line scanning generator, coincidence of the two kinds of pulses at one of the transistors being effective to transfer the charge, produced by light on the associated elemental area of a photoconductor, to an output circuit to develop a video signal.

This invention relates to solid state image pickup devices and particularly to means for selectively deriving image representative signals from such devices.

In lieu of such well-known image pickup devices as the image orthicon and the vidicon which develop image representative signals by scanning a photosensitive target electrode with an electron beam in an evacuated envelope, it has been proposed to use a solid state device which can be arranged in panel form and which does not require scanning by an electron beam. The image representative signals may be derived by systematically addressing different elemental areas of the light sensitive portion of the panel device. Particularly well suited as the light sensitive element of such a device is a photoconductor of the same general character as that used in a vidicon pickup tube.

The signal deriving arrangement in accordance with the present invention comprises an insulated-gate field-effect transistor at each elemental area of the photoconductor. The electrical charges produced at the different elemental areas as a result of the subject representative light falling thereon are selectively transferred to an output circuit to form the image representative video signals by actuating the transistors successively one at a time. This is accomplished by applying one series of pulses to the source-drain circuits of all of the transistors in one row after another and by applying another series of pulses to the gate circuits of all of the transistors in one column after another. Coincidence of the pulses of the two series of pulses at any one of the transistors is effective to render the transistor operative to transfer the photoconductor charge at the associated elemental area to the output circuit for the development of a video signal.

For a better understanding of the invention, reference may be had to the following description which is taken with the accompanying drawings of which:

Figures 1, 2:
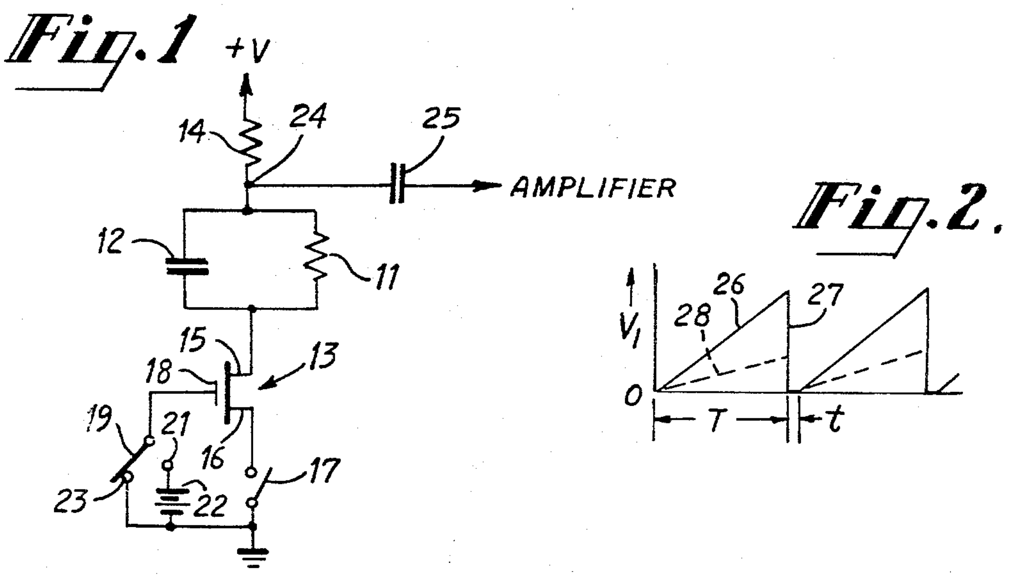
FIGURE 1 is an equivalent circuit of the apparatus in accordance with the invention by which video signals are developed from one elemental area of a solid state image pickup device.
FIGURE 2 is a graph showing the manner in which an elemental area of such a pickup device is alternately charged and discharged.

In FIGURE 1, the light sensitive photoconductor is represented by a resistor 11 and a capacitor 12. The value of the resistor 11 changes in response to the light falling on the photoconductor. As the light increases, the resistance decreases. Also, the photoconductor has an inherent capacitance with functions as a charge storage element. It is periodically charged from an external source which is then removed, after which the capacitor 12 discharges through the resistor 11. The rate at which the capacitor is discharged depends upon the value of the resistor 11 which in turn depends upon the amount of light reaching the associated elemental area of the pickup device. During the recharging process, the amount of charge depends upon the amount by which the capacitor 12 has been discharged and the charging current traversing a load impedance is the means by which the video signal is developed. In the present instance, an insulated-gate field-effect transistor 13 is the means by which the capacitor 12 is periodically charged. The charging circuit for the capacitor 12 includes a load resistor 14 the semiconductor path between the drain and source electrodes 15 and 16 respectively of the transistor 13 and the closed switch 17. The transistor 13 is rendered operative under the control its insulated-gate electrode 18 and switch 19, when engaged with its contact 21 for connection to a voltage source 22. Normally, switch 19 is effectively engaged with its contact 23 so as to hold the gate electrode 18 at ground potential, thereby rendering the transistor 13 inoperative. The charging current flow through load resistor 14 produces a signal at an output terminal 24 representative of the charge of the capacitor 12 and of the light reaching the particular elemental area of the photoconductor. The signal developed at terminal 24 may then be coupled to a suitable video signal amplifier such as by a capacitor 25.

FIGURE 2 graphically represents the alternate charging and discharging of the inherent capacitance of the photoconductor. During time T while transistor 13 of FIGURE 2 is nonconducting, the solid line 26 represents the discharge of the capacitor 12 through the resistor 11 in response to a relatively high light level and the solid line 27 represents the charging of the capacitor through the load resistor 14 during the brief time interval $t$ when the transistor 13 is conductive. The broken line 28 represents the discharge of the capacitor 12 through the resistor 11 at a relatively low light level.

Figure 3:
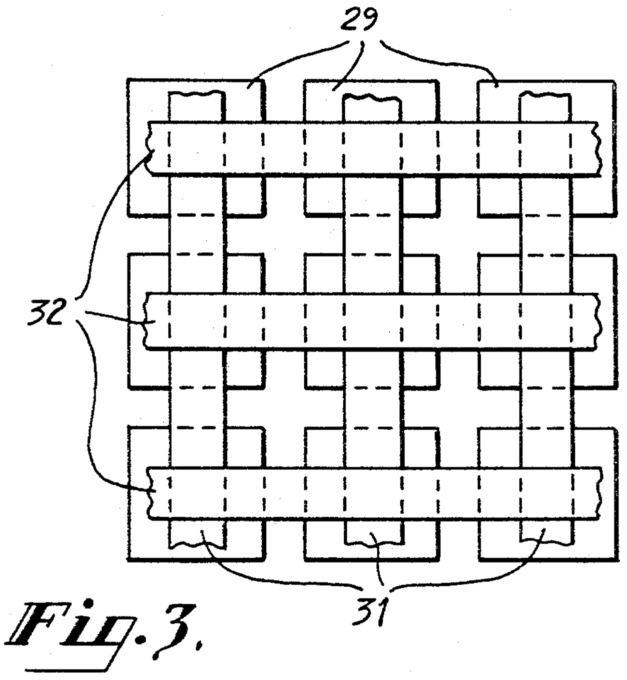
FIGURE 3 is a fragmentary view showing the general arrangement of the transistors relative to the elemental areas of the pickup device.

In FIGURE 3 there are represented the relative positions of the three electrodes of a small number of the insulated-gate field-effect transistors located at elemental areas of the image pickup device. The drain electrodes 29 are in discrete island-like form and are of approximately elemental area dimensions, the gate electrodes 31 are in strip form serving, respectively, all of the transistors in a plurality of columns and the source electrodes also are in strip form serving, respectively, all of the transistors in a plurality of rows.

Figure 4:
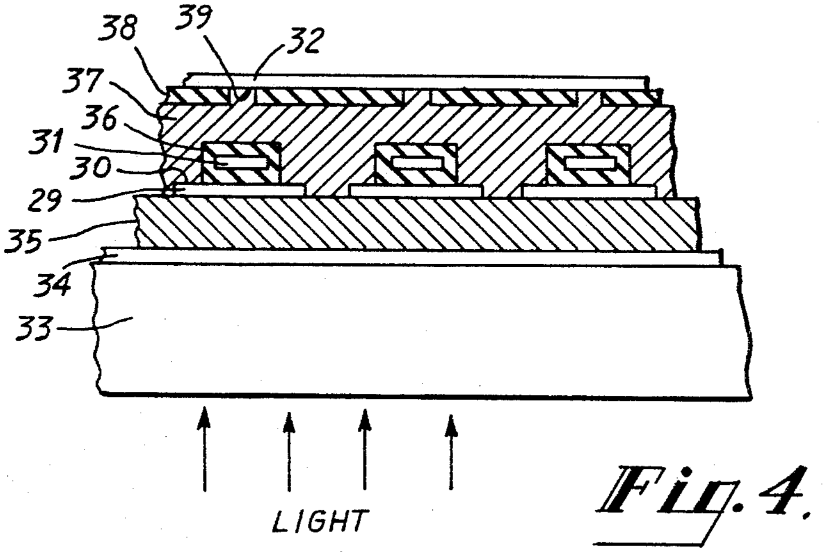
FIGURE 4 is a cross-sectional view of a portion of one structure comprising a solid state image pickup device in which the present invention may be embodied.

As an example of the physical structure of an array such as that shown in FIGURE 3, which may be used in a device of the character described, reference now is made to FIGURE 4 in which the elements are exaggerated for explanatory purposes. The image pickup structure includes a transparent substrate 33 which, for example, may be glass. Light from the subject is received as indicated through the substrate, on the inner surface of which is a transparent metallic plate 34 which serves as an output electrode for the device. Over the signal output plate 34 is a layer 35 of photoconductor material. A suitable material for such use is cadmium sulfide (CdS) which has relatively low resistivity and relatively high sensitivity as compared with some other photoconductors such as antimony trisulfide ($Sb_2S_3$) commonly used in vidicon pickup tubes.

Superimposed upon the photoconductor layer 35 are the island-like drain electrodes 29 located at elemental areas of the pickup device. The drain electrodes are in electrical contact with the photoconductor 35. The gate electrode strips 31 are individually embedded in insulators 36 and are mounted directly over respective columns of the island-like drain electrodes 29. A semiconductor block 37 (e.g., of cadmium sulfide) extends throughout the entire area of the pickup device and is in good electrical contact with the areas 30 of the drain electrodes not covered by the insulators 36. The source electrode strips 32 are superimposed on the semiconductor block 37 from which they are insulated by insulator strips 38 except for the areas 39 directly over the respective drain electrodes 29 of the plurality of transistors. The source electrode strips 32 extend over respective rows of the island-like drain electrodes 29. In this way, the gate electrodes 31 control the current flow between the uninsulated surfaces 30 of the drain electrodes 29 and the uninsulated surfaces 29 of the source electrodes 32 of the associated transistors.

Figure 5:
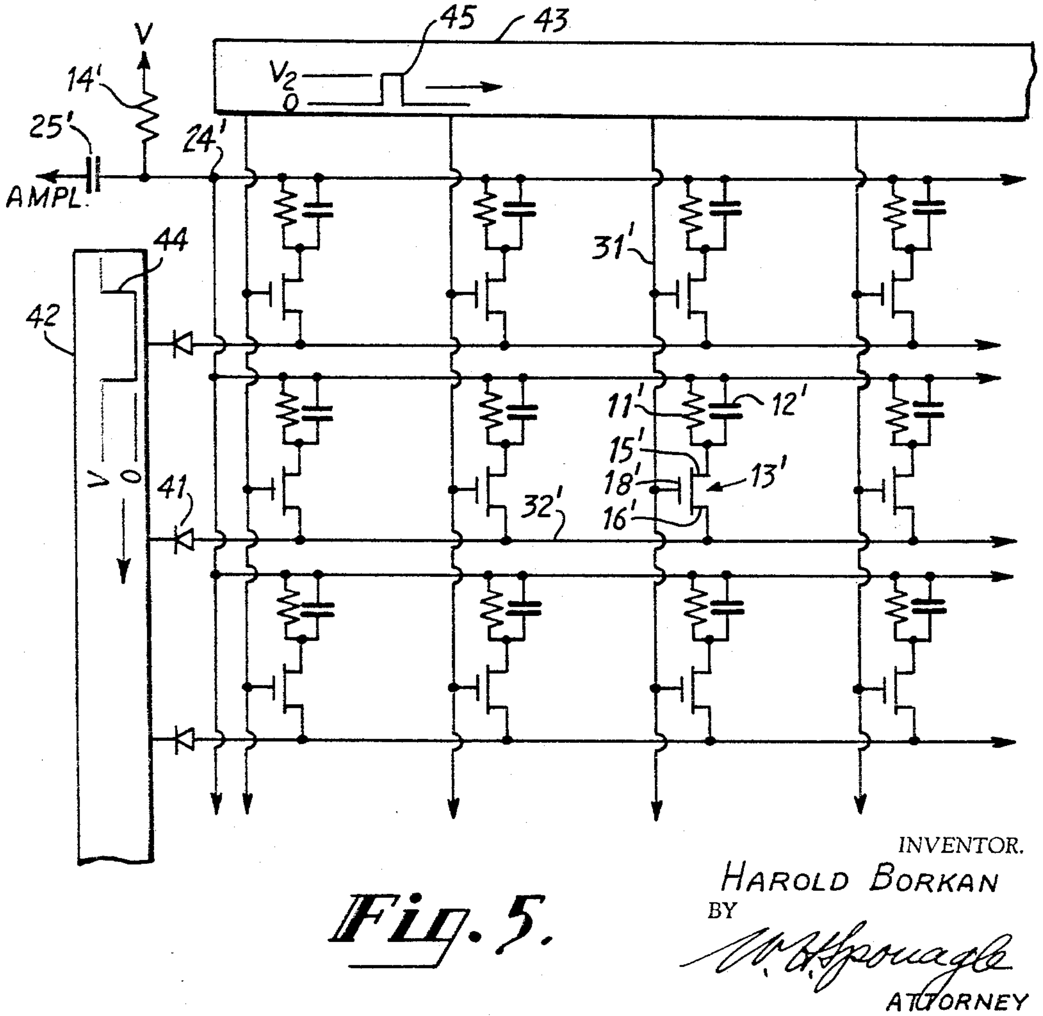
FIGURE 5 is an equivalent circuit representative portion of a solid state image pickup device illustrating the circuits by means of which video signals may be derived from such a device in accordance with the present invention.

In the equivalent circuit of a solid state image pickup panel of FIGURE 5, the various elemental areas of the photoconductor are indicated, as in FIGURE 1, by a parallel connection of a resistor and a capacitor. For example, one of the elemental of the photoconductors is represented by resistor 11′ and capacitor 12′. A corresponding control transistor 13′ for this area is shown with its drain electrode 15′ connected to the RC combination 11′–12′. The source electrode 16′ of this transistor is connected to one of the horizontal or row strips such as 32′, is connected through a diode 41 to a vertical scanning generator 42. Each of the column strips, such as the strip 31′ is connected to a horizontal scanning generator 43. These generators may be of the type shown in copending application of P. K. Weimer, Ser. No. 317,964, now Patent No. 3,252,009, filed Oct. 22, 1963 and titled "Pulse Sequence Generator." The vertical scanning generator 42 produces a series of pulses 44, which, for example, vary from a positive voltage V to a 0 or ground potential for a time approximately equal to one horizontal line scanning interval. The horizontal scanning generator 43 produces a series of pulses 45 which vary from 0 to ground potential to a positive voltage $V_2$ and are applied successively to the column gate strips 31′ for an elemental scanning interval.

The solid state image pickup device is provided with an operating voltage V supplied through a load impedance device such as a resistor 14′, which is connected to the output electrode 24′. The image representative video signals developed across the resistor 14 are applied, such as by means of a coupling capacitor 25′, to a suitable video amplifier.

During the exposure of each of the elemental areas of the photoconductor to light derived from a subject, the associated transistor, such as the transistor 13′, is inactive. When the row of elemental photoconductor areas including that associated with the transistor 13′ is to be scanned, the vertical scanning pulse 44 switches the voltage applied to the diode 41 in a negative direction to ground or 0 potential, for example. The diode 41 becomes conductive, thereby applying a ground potential to the source electrode 16′ of the transistor 13′. Even though the drain electrode 15′ of the transistor 13′ is connected through the photoconductor, represented by the resistor 11′ and the capacitor 12′, to the output electrode 34′ and thence to the operating voltage source V, the transistor 13′ is not actuated because the gate electrode 18′ is held at 0 or ground potential by its connection to the horizontal scanning generator 43. When the horizontal scanning pulse 45, which is positive going to a voltage $V_2$ is applied to the column strip 31′, the positive voltage applied to the gate electrode 18′ actuates the transistor 13′ so as to charge the capacitor 12′. The circuit for the charging current includes the load resistor 14′, the output electrode 24′, the capacitor 12′, the drain-to-source electrode path of the transistor 13′ and the diode 41 to ground at the vertical scanning generator 42. As explained in connection with FIGURES 1 and 2, the charging current required to charge the capacitor 12′ is dependent upon the amount of the previous charge on this capacitor which has leaked away through the photoconductor represented by the resistor 11′. The charging current thus is dependent upon the amount of light which has fallen upon the elemental photoconductor area subsequent to its previous scansion. In the described manner, each of the elemental areas of the pickup device is addressed or scanned to develop video signals representative of the light image to which the device is exposed.

The particular structural configuration of FIGURE 4 represents one way in which a solid state image pickup device may be fabricated to incorporate the present invention. Other ways capable of use with the present invention may be devised by those skilled in the art. Also, an enhancement type of insulated-gate field-effect transistor is preferred for use with the invention because the source-to-drain electrode current of such a device is neglible when no voltage is applied to the gate electrode.

Among the advantages of an arrangement in accordance with this invention is the fact that the photoconductor 35 of FIGURE 4 may be a continuous layer and the signal output plate 34 may be a continuous transparent conducting sheet, both of which are similar to corresponding elements of vidicon pickup tubes. Another advantage of the arrangement is that the on-to-off source-to-drain electrode current ratio need only be large compared to the number of elemental areas in one row. In other arrangements, this current ratio needs to be large compared to the total number of elemental areas in the entire array.

What is claimed is:

1. In a solid state image pickup device including a photoconductor having a plurality of elemental areas arranged in rows and columns and adapted to receive light from a subject and thereby to develop charge at said elemental areas representative of said light derived from corresponding elemental portions of said subject, apparatus for selectively transferring said elemental area charges to an output circuit comprising:

an insulated-gate field-effect transistor having source, drain and gate electrodes at each elemental area of said photoconductor;

energizing circuits for the source and drain electrodes of said respective transistors;

first circuit means for applying a first series of voltage pulses to the energizing circuits of all of the transistors associated with said elemental photoconductor areas in successive ones of said rows; and second circuit means for applying a second series of voltage pulses to the gate electrodes of all of the transistors associated with said elemental photoconductor areas in successive ones of said columns;

coincidence of said first and second voltage pulses at any one of said transistors being effective to transfer the photoconductor charge at the associated elemental area to said output circuit.

2. Charge transferring apparatus in a solid state image pickup device as defined in claim 1 wherein:

each of said first series of voltage pulses has a time duration equal substantially to the time duration of a line scanning interval; and each of said second series of voltage pulses has a time duration equal substantially to the ratio of said line scanning interval to the number of said elemental areas in one of said rows.

3. Charge transferring apparatus in a solid state image pickup device as defined in claim 2 wherein:

corresponding ones of said source and drain electrodes of all of said transistors in each of said respective rows are connected together to form a first series of common circuits; and all of said gate electrodes of all of said transistors in each of said respective columns are connected together to form a second series of common circuits.

4. Charge transferring apparatus in a solid state image pickup device as defined in claim 3 wherein:

each of said first series of common circuits includes a device having a high impedance in the absence of the application thereto of said first series of voltage pulses and a low impedance during the application thereto of said first series of voltage pulses.

5. Charge transferring apparatus in a solid state image pickup device as defined in claim 4 wherein:

said device included in each of said first series of common circuits is a diode polarized to be conductive only to said first series of voltage pulses.

6. Charge transferring apparatus in a solid state image pickup device as defined in claim 5 wherein:

said source electrodes of the transistors in each of said respective rows are connected together to form said first series of common circuits.

References Cited

UNITED STATES PATENTS

| | | | |
|---|---|---|---|
| 2,992,409 | 7/1961 | Lawrence | 340—166 |
| 3,083,262 | 3/1963 | Hanlet | 178—7.1 |

OTHER REFERENCES

Garcia, "Voltage Checking Device," IBM Tech. Disclosure Bulletin, vol. 8, No. 4, September 1965.

ROBERT L. GRIFFIN, *Primary Examiner.*

R. L. RICHARDSON, *Assistant Examiner.*

U.S. Cl. X.R.

340—166; 250—211; 307—304